(12) United States Patent
Thommana et al.

(10) Patent No.: US 12,388,480 B2
(45) Date of Patent: Aug. 12, 2025

(54) FREQUENCY SELECTION ALGORITHM FOR RESILIENT HF COMMUNICATION

(71) Applicant: Rockwell Collins, Inc., Cedar Rapids, IA (US)

(72) Inventors: John V. Thommana, Cedar Rapids, IA (US); Joseph Splean, II, Ely, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 378 days.

(21) Appl. No.: 18/130,687

(22) Filed: Apr. 4, 2023

(65) Prior Publication Data
US 2024/0340032 A1    Oct. 10, 2024

(51) Int. Cl.
*H04W 4/00* (2018.01)
*H04B 1/00* (2006.01)
*H04B 1/10* (2006.01)

(52) U.S. Cl.
CPC ......... *H04B 1/1027* (2013.01); *H04B 1/0003* (2013.01); *H04B 1/0053* (2013.01)

(58) Field of Classification Search
CPC ............. H04W 40/02; H04W 72/0453; H04W 72/541; H04W 16/20; H04W 40/12; H04W 40/16; H04W 40/20; H04W 40/22; H04W 28/04; H04W 72/04; H04W 72/042; H04W 88/08; H04W 28/08; H04W 28/084; H04W 36/22; H04W 72/12; H04L 5/0007
See application file for complete search history.

(56) References Cited

U.S. PATENT DOCUMENTS

| | | |
|---|---|---|
| 7,092,402 B1 | 8/2006 | Smith et al. |
| 8,311,488 B2 | 11/2012 | Furman et al. |
| 9,094,088 B2 | 7/2015 | Baqar et al. |
| 9,282,500 B1 | 3/2016 | Thommana et al. |
| 10,051,606 B1 | 8/2018 | Nelson et al. |
| 10,116,382 B1 | 10/2018 | Thommana et al. |
| 10,693,683 B1 | 6/2020 | Nelson et al. |
| 11,309,954 B2 | 4/2022 | Babich |

(Continued)

FOREIGN PATENT DOCUMENTS

| | | | |
|---|---|---|---|
| EP | 3855642 A1 | 7/2021 | |
| EP | 4443749 A1 * | 10/2024 | ........... H04B 1/0053 |

OTHER PUBLICATIONS

Elbanhawi et al., "Enabling technologies for autonomous MAV operations," Progress in Aerospace Sciences, Mar. 30, 2017, 26 pages.

(Continued)

*Primary Examiner* — Phuongchau Ba Nguyen
(74) *Attorney, Agent, or Firm* — Suiter Swantz IP

(57) ABSTRACT

Techniques for selecting frequencies of operation are described. HF signals may land at the receiver node with power levels dependent upon the transmit frequency. The frequency with the highest power level at the receiver node may be selected when the receiver node is not subject to interfering. The receiver node may be unable to receive a desired signal if an interfering signal has a signal level which is higher than the desired signal. The transmitter node may select a frequency which has a receiver signal level which is higher than the interfering signal for the selected frequency. The receiver node may then receive the transmit signal at the selected frequency even when subject to interfering from the interferer node.

19 Claims, 17 Drawing Sheets

(56) References Cited

U.S. PATENT DOCUMENTS

| | | | |
|---|---|---|---|
| 11,425,605 | B1 | 8/2022 | Cheng |
| 11,451,291 | B2 | 9/2022 | Thommana et al. |
| 11,490,452 | B2 | 11/2022 | Thommana et al. |
| 2016/0212683 | A1 | 7/2016 | Freeman |
| 2021/0159946 | A1 | 5/2021 | Raghavan et al. |
| 2023/0092997 | A1 | 3/2023 | Mody et al. |
| 2024/0340757 | A1* | 10/2024 | Thommana ......... H04W 72/541 |

OTHER PUBLICATIONS

European Patent Office, Extended European Search Report received in EP Application No. 24166015.8, Jul. 26, 2024, 8 pages.

European Patent Office, Extended European Search Report received in EP Application No. 24168083.4, Aug. 6, 2024, 16 pages.

Department of Defense Interface Standard, "Interoperability and Performance Standards for Data Modems," MIL-STD-188-110D, Dec. 29, 2017.

* cited by examiner

620

622
Determine LUF and MUF from (FX/INT) to RX

624
Determine propagation loss from (FX/INT) to RX for each frequency

626
Determine received power at RX of signal from (FX/INT) for each frequency

| FREQUENCY TABLE |
|---|
| F(1) |
| F(2) |
| ... |
| F(N-1) |
| F(N) |

402a-c

|  | Position |
|---|---|
| TX | (lat, long) |
| INT(1) | (lat, long) |
| INT(2) | (lat, long) |
| ... | ... |
| INT(M) | (lat, long) |
| RX | (lat, long) |

FIG. 7A 404a, b

|  | F(1) | F(2) | ... | F(N-1) | F(N) |
|---|---|---|---|---|---|
| TX EIRP | dBm | dBm | ... | dBm | dBm |
| INT(1) EIRP | dBm | dBm | ... | dBm | dBm |
| INT(2) EIRP | dBm | dBm | ... | dBm | dBm |
| ... | ... | ... | ... | ... | ... |
| INT(M) EIRP | dBm | dBm | ... | dBm | dBm |

FIG. 7B 504, 506, 508

|  | LUF | MUF | Prop. Loss at F(1) | Prop. Loss at F(2) | ... | Prop. Loss at F(N-1) | Prop. Loss at F(N) |
|---|---|---|---|---|---|---|---|
| TX to RX | MHz | MHz | dBm | dBm | ... | dBm | dBm |
| INT (1) to RX | MHz | MHz | dBm | dBm | ... | dBm | dBm |
| INT (2) to RX | MHz | MHz | dBm | dBm | ... | dBm | dBm |
| ... | ... | ... | ... | ... | ... | ... | ... |
| INT (M) to RX | MHz | MHz | dBm | dBm | ... | dBm | dBm |

|  | Rcv'd Power at F(1) | Rcv'd Power at F(2) | ... | Rcv'd Power at F(N-1) | Rcv'd Power at F(N) |
|---|---|---|---|---|---|
| TX to RX | dBm | dBm | ... | dBm | dBm |
| INT (1) to RX | dBm | dBm | ... | dBm | dBm |
| INT (2) to RX | dBm | dBm | ... | dBm | dBm |
| ... | ... | ... | ... | ... | ... |
| INT (M) to RX | dBm | dBm | ... | dBm | dBm |

| | Rcv'd Power at F(1) | Rcv'd Power at F(2) | ... | Rcv'd Power at F(N-1) | Rcv'd Power at F(N) |
|---|---|---|---|---|---|
| TX to RX | F(1) Below TX to RX LUF | dBm | ... | dBm | F(N) above TX to RX MUF |
| INT (1) to RX | F(1) Below TX to RX LUF | dBm | ... | dBm | F(N) above TX to RX MUF |
| INT (2) to RX | F(1) Below TX to RX LUF | dBm | ... | dBm | F(N) above TX to RX MUF |
| ... | ... | ... | ... | ... | ... |
| INT (M) to RX | F(1) Below TX to RX LUF | dBm | ... | dBm | F(N) above TX to RX MUF |

| | F(1) | F(2) | ... | F(N-1) | F(N) |
|---|---|---|---|---|---|
| RX Sensitivity | F(1) Below TX to RX LUF | dBm | ... | dBm | F(N) above TX to RX MUF |

| | Rcv'd Power at F(1) | Rcv'd Power at F(2) | ... | Rcv'd Power at F(N-1) | Rcv'd Power at F(N) |
|---|---|---|---|---|---|
| TX to RX | F(1) Below TX to RX LUF | TX to RX Rcv'd power below RX Sens. | ... | dBm | F(N) above TX to RX MUF |
| INT (1) to RX | F(1) Below TX to RX LUF | TX to RX Rcv'd power below RX Sens. | ... | dBm | F(N) above TX to RX MUF |
| INT (2) to RX | F(1) Below TX to RX LUF | TX to RX Rcv'd power below RX Sens. | ... | dBm | F(N) above TX to RX MUF |
| ... | ... | ... | ... | ... | ... |
| INT (M) to RX | F(1) Below TX to RX LUF | TX to RX Rcv'd power below RX Sens. | ... | dBm | F(N) above TX to RX MUF |

| Frequency | F(3) | F(4) | ... | F(N-2) | F(N-1) |
|---|---|---|---|---|---|
| Link Margin | dB | dB | ... | dB | dB |

810
Split short listed frequency table into primary list and secondary list based on interferer MUF

820
Sort primary list and secondary list based on link margin

832
Append secondary list to primary list

834
Append primary list to secondary list

670

FIG. 8

FREQUENCY SELECTION ALGORITHM FOR RESILIENT HF COMMUNICATION

TECHNICAL FIELD

The present invention generally relates to communication systems, and more specifically to resilient and resistant HF communication.

BACKGROUND

Radio Frequency (RF) communication provide long-range communication for a plurality of stationary and moving nodes (stations). High Frequency (HF) waveforms may possess qualities specifically suited for long range communication. However, the HF waveforms are not designed to operate during periods of active denial and intentional/unintentional interference. The long-range communication can then be denied by the active intentional and unintentional interference. Therefore, it would be advantageous to provide a device, system, and method that cures the shortcomings described above.

SUMMARY

A software-defined radio is described in accordance with one or more embodiments of the present disclosure. In some embodiments, the software-defined radio includes a memory maintaining program instructions. In some embodiments, the software-defined radio includes one or more processors configured to execute the program instructions. In some embodiments, the program instructions cause the one or more processors to determine a first lowest usable frequency (LUF) and a first maximum usable frequency (MUF). The first LUF and the first MUF are from a transmitter node to a receiver node. In some embodiments, the program instructions cause the one or more processors to determine a first plurality of received powers at the receiver node for a plurality of frequencies in a high-frequency (HF) band. The first plurality of received powers are signals from the transmitter node. In some embodiments, the program instructions cause the one or more processors to determine a second plurality of received powers at the receiver node for the plurality of frequencies. The second plurality of received powers are signals from an intentional/unintentional interferer node, henceforth known as an interferer node. In some embodiments, the program instructions cause the one or more processors to determine a first subset of the plurality of frequencies by discarding any of the plurality of frequencies which are above the first MUF and by discarding any of the plurality of frequencies which are below the first LUF. In some embodiments, the program instructions cause the one or more processors to determine a plurality of receive sensitivities of the receiver node for each of the first subset. In some embodiments, the program instructions cause the one or more processors to determine a second subset of the first subset by discarding any of the first subset in which the first plurality of received powers are below the plurality of receive sensitivities and in which the first plurality of received powers are below the second plurality of received powers.

A method is described, in accordance with one or more embodiments of the present disclosure. In some embodiments, the method includes determining a first lowest usable frequency (LUF) and a first maximum usable frequency (MUF). The first LUF and the first MUF are from a transmitter node to a receiver node. In some embodiments, the method includes determining a first plurality of received powers at the receiver node for a plurality of frequencies in a high-frequency (HF) band. The first plurality of received powers are signals from the transmitter node. In some embodiments, the method includes determining a second plurality of received powers at the receiver node for the plurality of frequencies. The second plurality of received powers are signals from an interferer node. In some embodiments, the method includes determining a first subset of the plurality of frequencies by discarding any of the plurality of frequencies which are above the first MUF and by discarding any of the plurality of frequencies which are below the first LUF. In some embodiments, the method includes determining a plurality of receive sensitivities of the receiver node for each of the first subset. In some embodiments, the method includes determining a second subset of the first subset by discarding any of the first subset in which the first plurality of received powers are below the plurality of receive sensitivities and in which the first plurality of received powers are below the second plurality of received powers.

An HF mission planner is described, in accordance with one or more embodiments of the present disclosure. In some embodiments, the HF mission planner includes a memory maintaining program instructions. In some embodiments, the HF mission planner includes one or more processors configured to execute the program instructions. In some embodiments, the program instructions cause the one or more processors to determine a first lowest usable frequency (LUF) and a first maximum usable frequency (MUF). The first LUF and the first MUF are from a transmitter node to a receiver node. In some embodiments, the program instructions cause the one or more processors to determine a first plurality of received powers at the receiver node for a plurality of frequencies in a high-frequency (HF) band. The first plurality of received powers are signals from the transmitter node. In some embodiments, the program instructions cause the one or more processors to determine a second plurality of received powers at the receiver node for the plurality of frequencies. The second plurality of received powers are signals from an interferer node. In some embodiments, the program instructions cause the one or more processors to determine a first subset of the plurality of frequencies by discarding any of the plurality of frequencies which are above the first MUF and by discarding any of the plurality of frequencies which are below the first LUF. In some embodiments, the program instructions cause the one or more processors to determine a plurality of receive sensitivities of the receiver node for each of the first subset. In some embodiments, the program instructions cause the one or more processors to determine a second subset of the first subset by discarding any of the first subset in which the first plurality of received powers are below the plurality of receive sensitivities and in which the first plurality of received powers are below the second plurality of received powers.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIGS. 6A-6B depicts a flow diagram of a method, in accordance with one or more embodiments of the present disclosure.

FIG. 7A depicts a frequency table and node positions, in accordance with one or more embodiments of the present disclosure.

FIG. 7B depicts node Effective Isotropic Radiated Powers (EIRPs), in accordance with one or more embodiments of the present disclosure.

FIG. 7C depicts lowest useable frequencies (LUFs), maximum useable frequencies (MUFs), and propagation losses between nodes, in accordance with one or more embodiments of the present disclosure.

FIG. 7D depicts received powers between nodes, in accordance with one or more embodiments of the present disclosure.

FIG. 7E depicts discarding frequencies below a LUF and above a MUF between a transmitter node and a receiver node, in accordance with one or more embodiments of the present disclosure.

FIG. 7F depicts determining receive sensitivities for frequencies between the LUF and the MUF, in accordance with one or more embodiments of the present disclosure.

FIG. 7G depicts discarding frequencies with a signal from a transmitter node to a receiver node below a receive sensitivity, in accordance with one or more embodiments of the present disclosure.

FIG. 7H depicts a short-listed frequency table, in accordance with one or more embodiments of the present disclosure.

FIG. 8 depicts a flow diagram of a method, in accordance with one or more embodiments of the present disclosure.

DETAILED DESCRIPTION OF THE INVENTION

Figure 1:
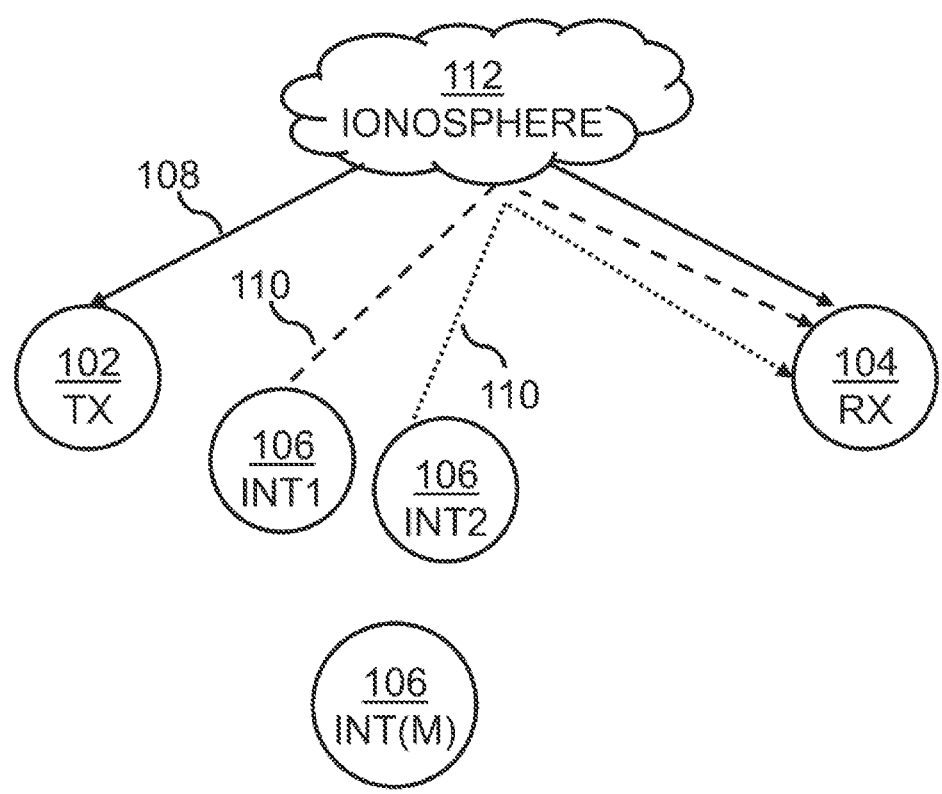
FIG. 1 depicts a system including a transmitter node, a receiver node, and interferer nodes, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring generally now to one or more embodiments of the present disclosure. Embodiments of the present disclosure are generally directed to a system and method that enables HF waveforms to operate in environment subject to interfering. A communication link budget with potential interferer link budgets is iteratively computed. A frequency is then selected that can overcome interfering from each interferer.

U.S. Pat. No. 9,282,500, titled "Ad hoc high frequency with advanced automatic link establishment system and related method", filed on Jun. 17, 2014; U.S. Pat. No. 10,116,382, titled "Ad hoc high frequency network", filed on Feb. 24, 2017; and U.S. Pat. No. 11,490,452, titled "Ad-hoc HF time frequency diversity", filed on Jan. 20, 2020; are incorporated herein by reference in the entirety.

Referring now to FIG. 1, a system 100 is described, in accordance with one or more embodiments of the present disclosure. The system 100 may also be referred to as a communication network, a high frequency (HF) communication network, and/or a beyond line-of-sight (BLOS) communication network.

The system 100 may include one or more nodes, such as, but not limited to, transmitter nodes 102, receiver nodes 104, interferer nodes 106, and the like.

The transmitter nodes 102 and the receiver nodes 104 may be considered a network of nodes. The transmitter nodes 102 may also function as receiver nodes 104, and vice versa. The transmitter nodes 102 and the receiver nodes 104 may include a common mission and may desire to establish communication. The transmitter node 102 may be considered a node which transmits for the purpose of communication. The nodes may switch between being the transmitter node 102 and the receiver node 104 during bidirectional communication.

The transmitter nodes 102 and the receiver nodes 104 may establish a communication link 108. The communication link 108 may enable communication between the transmitter nodes 102 and the receiver nodes 104. For example, the transmitter nodes 102 may transmit a waveform to the receiver nodes 104 to establish the communication link 108. The communication link 108 may be a connection between the nodes enabling transfer of data over the waveform in space.

The communication link 108 may refer to a beyond line-of-sight communication link in a high frequency (HF) band. The HF band may include a frequency range from 3 MHz to 30 MHz. For example, the waveform may follow a path. The path may refer to a physical path the waveform travels in space between nodes. The waveform may be transmitted from the transmitter node 102, reflected from the ionosphere 112, and received by the receiver node 104.

The transmitter nodes 102 and the receiver nodes 102 may include a frequency table (e.g., frequency table 406). The frequency table may include a plurality of frequencies (F) in the HF band. The frequency table may include any number (N) of the frequencies in the HF band. For example, the frequency table may commonly include ten or more frequencies (F1-F10) in the HF band, although this is not intended as a limitation of the present disclosure. It is contemplated that the frequency table may include hundreds or more of frequencies in the HF band. The transmitter nodes 102 and the receiver nodes 104 may use any of the frequencies to establish the communication link 108.

The system 100 may also include intentional/unintentional interferer nodes 106. The interferer nodes 106 may be considered a node which communicates for the purpose of intentionally or unintentionally interfering communication from other nodes. The interferer nodes 106 may be located at various positions on earth. The interferer nodes 106 may include directional antennas and/or omnidirectional antennas operable in the HF band. The antennas of the interferer nodes 106 may deliver a given Effective Isotropic Radiated Power (EIRP). The EIRP may indicate the transmit power leaving an antenna. The EIRP may account for the impact of the transmitter and the antenna. For example, an antenna gain parameter may be ignored using the EIRP.

The position and/or the EIRP of the interferer nodes 106 may be known by the transmitter nodes 102 and/or the receiver nodes 104. For example, the interferer nodes 106 may be located at a fixed position (e.g., fixed-site interferer nodes). For example, the fixed-site interferer nodes may have restrictions in changing EIRP such that the EIRP may be determined a priori. The fixed-site interferer nodes are also located at a fixed position or site which is detectable by satellite or another method. The position and EIRP of the interferer nodes 106 may then be provided to the transmitter nodes 102 and/or the receiver nodes 104.

The fixed-site interferer nodes may achieve a high Effective, Isotropic Radiated Power (EIRP) in the high frequency (HF) band. A high EIRP in the HF band may refer to 1 KW or more. Interferer nodes which are mobile are not as powerful as fixed site interferers. For example, the EIRP of the mobile interferer nodes may be limited by antenna size and antenna gain due to the size of the platform hosting the antenna. The low EIRP of the mobile interferer nodes may reduce the effectiveness of interfering BLOS communications.

The interferer node 106 may transmit a signal 110 to the receiver node 104 intentionally or unintentionally on the same frequency as the signal from the transmitter node 102. The interfering signal 110 may increase a noise level at the receiver node 104, or similarly decrease a signal-to-noise ratio of the communication link 108. The interfering signal 110 may then cause the receiver node to be unable to hear the signal transmitted from the transmitter node 102. Thus, ensuring the receiver node 104 receives the communication link 108 in the HF band while being subject to the interfering signal 110 by interferer nodes is desirable.

The communication link 108 may reflect from the ionosphere 112 in one or more hops between the transmitter nodes 102 and the receiver nodes 104. Similarly, the interfering signal 110 may reflect from the ionosphere 112 in one or more hops from the interferer nodes 106 to the receiver nodes 104. For example, the communication link 108 and interfering signal 110 may reflect from any of the layers (e.g., E layer, F layer) of the ionosphere 112 in one hop or multiple hops before being received by the receiver nodes 104.

The propagation of HF signals reflected from the ionosphere 112 may be dependent on one or more factors, such as, but not limited to, the time of the day, the season of the year. the sunspot number, ionospheric conditions, transmit power, and the like. The ionospheric conditions may change drastically during solar flares, coronal mass ejections, and manmade scintillation environments. Thus, there is no guarantee that any frequency in the HF band will work for communication between each of the nodes of the system 100. The time of day, sunspot number, and ionospheric conditions may be the same for each node in the network at a given date and time. The distance and transmit power may vary for each node in the network.

The probability of the communication link 108 from the transmitter node 102 being received by the receiver node 104 may be low when the receiving nodes 104 are subject to the interfering signal 110. In embodiments, the transmitter nodes 102 may account for the interfering signal 110 when determining a transmit frequency. The transmitter node may pick a frequency that the transmitter node and receiver node may use to communicate which the interferers cannot employ.

Figure 2:
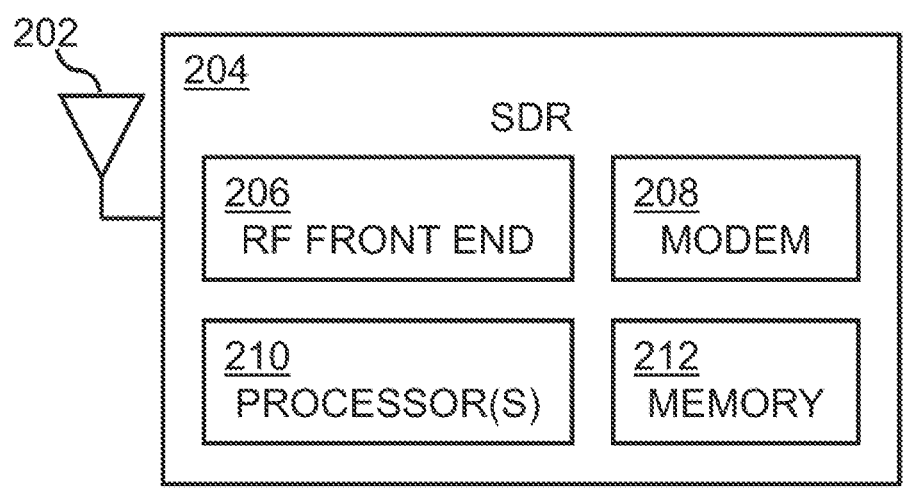
FIG. 2 depicts a simplified block diagram of a node including an antenna and a software-defined radio, in accordance with one or more embodiments of the present disclosure.

Referring now to FIG. 2, a node 200 is described, in accordance with one or more embodiments of the present disclosure. The node 200 may be an example of the transmitter node 102 and/or the receiver node 104. The node 200 may include one or more antennas 202 and software-defined radio 204 (SDR).

The software-defined radio 204 may include one or more components, such as, but not limited to, a radio frequency (RF) front end 206, modem 208, processors 210, memory 212, and the like. As may be understood, the software-defined radio 204 may include a number of components, permutations, and arrangements, which are not set forth herein for clarity.

The antennas 202 may provide an interface between the HF radio waves (e.g., the communication link 108) and an RF electrical signal. The antennas 202 be coupled to the software-defined radio 204. For example, the antennas 202 may be coupled to the software-defined radio 204 by one or more switches (not depicted), although this is not intended to be limiting. The antennas 202 may be coupled to RF front end 206 of the of the software-defined radio 204.

The RF front end 206 may provide one or more functions, such as, but not limited to, process the RF electrical signal. For example, the RF front end 206 may perform frequency up conversion, frequency down conversion, filtering, amplification, signal mixing, and the like.

The modem 208 may provide one or more functions, such as, but not limited to, modulation and/or demodulation functions. For example, the modem 208 may modulate signals to the RF front end 206 and/or demodulate signals from the RF front end 206.

The software-defined radio 204 may include functionality defined by software. The software-defined radio 204 may include signal processing functionality defined in software, for generating a waveform as sampled digital signals, converting from digital to analog via high-speed Digital-to-Analog Converter (DAC), and then translating to Radio Frequency (RF) for wireless propagation to a receiver. For example, the memory 212 may maintain program instructions. The program instructions may provide the various functionality. The program instructions may be executable by the processors 210 for performing any of the various methods described herein. The processors 210 may also be coupled to the modem 208. The modem 208 may then provide an interface for modulating and demodulating the waveform with data. In this regard, the processors 210 and modem 208 may host one or more portions layers of a waveform protocol stack. In embodiments, the software-defined radios 204 may host a waveform protocol stack 300.

Figure 3:
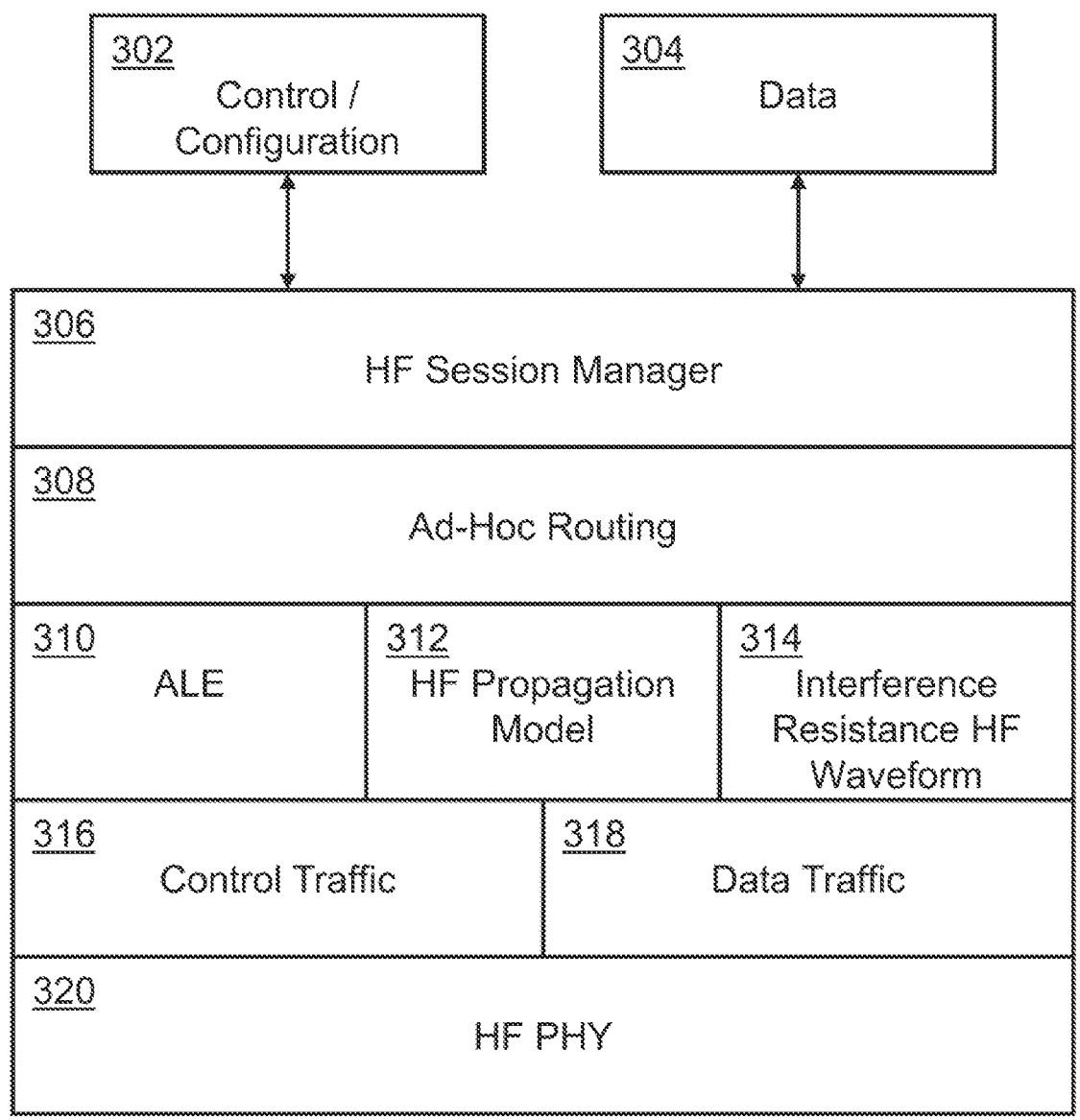
FIG. 3 depicts a waveform protocol stack, in accordance with one or more embodiments of the present disclosure.

Referring now to FIG. 3, a waveform protocol stack 300 is described, in accordance with one or more embodiments of the present disclosure. The node 200 may use the waveform protocol stack 300 to establish the communication link 108 when the receiver node 104 is subject to the interfering signal 110. The waveform protocol stack 300 may also be referred to as an HF waveform protocol stack, an ad-hoc waveform protocol stack, a resilient waveform protocol stack, a resistant ad-hoc HF waveform protocol stack, or the like.

The waveform protocol stack 300 may include one or more layers. A layer of the waveform protocol stack 300 may include control/configuration 302 and data 304.

Another layer of the waveform protocol stack 300 may include an HF session manager 306. The HF Session Manager 140 may perform various functions to setup and tear down the communication link 108 between nodes. In embodiments, the HF session manager 306 may operate automatic link establishment 310 (ALE), HF propagation model 312, and HF waveform 314 in a time-shared mode.

Another layer of the waveform protocol stack 300 may include an ad-hoc routing function 308. Ad-hoc may refer to data forwarding across a wireless network. The nodes in the wireless network may be mobile, such that routing must be performed ad hoc. The ad-hoc routing function 308 may include, but is not limited to, an Optimized Link State Routing Protocol (OLSR) or the like.

Another layer of the waveform protocol stack 300 may include an automatic link establishment 310 (ALE), a HF propagation model 312, and a resilient HF waveform 314. In embodiments, the waveform protocol stack 300 may simultaneously perform the automatic link establishment 310, the HF propagation model 312, and the HF waveform 314 without disrupting the communication link 108.

The automatic link establishment 310 may include sounding, call, and answer messages to enable ad-hoc HF. For example, the automatic link establishment 310 may sound a channel. Peer nodes may then record a link quality of the communication link 108 and order frequencies of the communication link 108 in descending order of link quality. The nodes 200 may use the frequency with the highest available link quality to communicate. A rate of the sounding may be selected based on a time or a speed or a change in position of the nodes. The automatic link establishment 310 may include, but is not limited to, sounding in accordance with MIL-STD-188-141D (ALE), although this is not intended to be limiting.

The messages in the automatic link establishment 310 may include various data regarding the nodes, such as, but not limited to, node identity (ID), position, velocity, frequency received, link quality, and the like.

Nodes may cycle through and transmit the sounding burst for each frequency in a frequency table. The other nodes may or may not receive the sounding burst. If the nodes do receive the sounding burst, the nodes record that the sounding burst from the transmitter node 102 was received at the selected frequency and with a given link quality. The nodes may then determine frequencies which propagate between the transmitter nodes 102 and the receiver nodes 104. If a node desires to initiate a call, the node sends a call request using the frequency with the best link quality. The nodes may then negotiate call parameters, bandwidth, data rate, and the like for establishing the communication link 108.

The sounding bursts may be transmitted in a matter which is unpredictable. In this regard, the sounding bursts may include a low-probability of being interfered. The nodes may initiate the communication link 108 using a frequency selected based link quality sent over the sounding signals. The interferer nodes 106 may initiate the interfering signals 110 during the communication link 108 at the current frequency of the communication link 108. The noise from the interfering signals 110 may prevent the receiver nodes 104 from receiving the desired signals above a receiver sensitivity, such that the communication link 108 is broken. For example, the nodes may establish the call parameters. The interferer nodes 106 may then interfere with the receiver node 104 subsequent to the nodes establishing the call parameters. The transmitter node 102 may be aware of the lost communication but unaware of the interfering signal 110.

In embodiments, the waveform protocol stack 300 may implement a frequency selection algorithm. The frequency selection algorithm selects frequencies which maintain the communication link 108 in the presence of the interfering signal 110.

The HF propagation model 312 may be in a same layer as the automatic link establishment 310. The HF propagation model 312 may model the propagation of HF signals in various conditions. The HF propagation model 312 may also be referred to as a coverage analysis program. The HF propagation model 312 may include any propagation model, such as, but not limited to, Voice of America Coverage Analysis Program (VOACAP), PropMan™ 2000, and the like. The HF propagation model 312 is further described with reference to FIG. 5.

The HF waveform 314 may be in the same layer as the HF propagation model 312 and the automatic link establishment 310. The HF waveform 314 may provide continuous maintenance of the communication link 108 and/or the HF waveform to and from nodes of the system 100.

Another layer of the waveform protocol stack 300 may include control traffic 316 and data traffic 318. The control traffic 316 may be packetized and sent on a control plane. The data traffic 318 may be packetized and sent on a data plane. Both the control traffic 316 and the data traffic 318 are packetized and transported over the same link by interspersing the packets. Traffic other than the actual data being transported can be characterized as control traffic 316. For example, the control traffic 316 may include sounding packets or routing packets.

Another layer of the waveform protocol stack 300 may include an HF physical layer 320 (HF PHY). The HF physical layer 320 may refer to the signal in space (e.g., the communication link 108) transmitted and/or received by the antenna 202. The HF physical layer 320 may be a time-division multiple access (TDMA) HF waveform.

In embodiments, the waveform protocol stack 300 may be considered denial resistant or resilient. The waveform protocol stack 300 may be operable beyond line-of-sight in an environment subject to interfering. The ability to operate the waveform protocol stack 300 in the interfering environment is desirable to ensure beyond line-of-sight (BLOS) communications between nodes. In embodiments, the waveform may include a level of robustness that is able to operate in an interfering environment. In particular, the waveform may be operable in an interfering environment which is subject to interference from interferers (e.g., interferer nodes 106) with a high EIRP in the HF band.

The waveform protocol stack 300 may be significantly more robust than existing HF waveforms. For example, the waveform protocol stack 300 may be more robust than the waveforms described in MIL-STD-188-110D. The most robust modes of MIL-STD-188-110D are the Walsh modes. The Walsh mode waveforms have a robustness similar to that of STANAG 4415. Walsh mode waveforms of MIL-STD-188-110D may not be sufficiently robust to counter the intentional interferer nodes. The existing set of Walsh modes waveforms are not robust enough to operate under extreme solar anomalies and/or active interfering conditions. In embodiments, the HF waveform 314 is more robust than waveform number 0 Walsh Mode defined MIL-STD-188-110D, although this is not intended to be limiting.

The waveform protocol stack 300 may also operate under a wide variety of delay spreads and Doppler spreads typically seen under normal/moderately disturbed ionospheric conditions worldwide.

Figure 4:
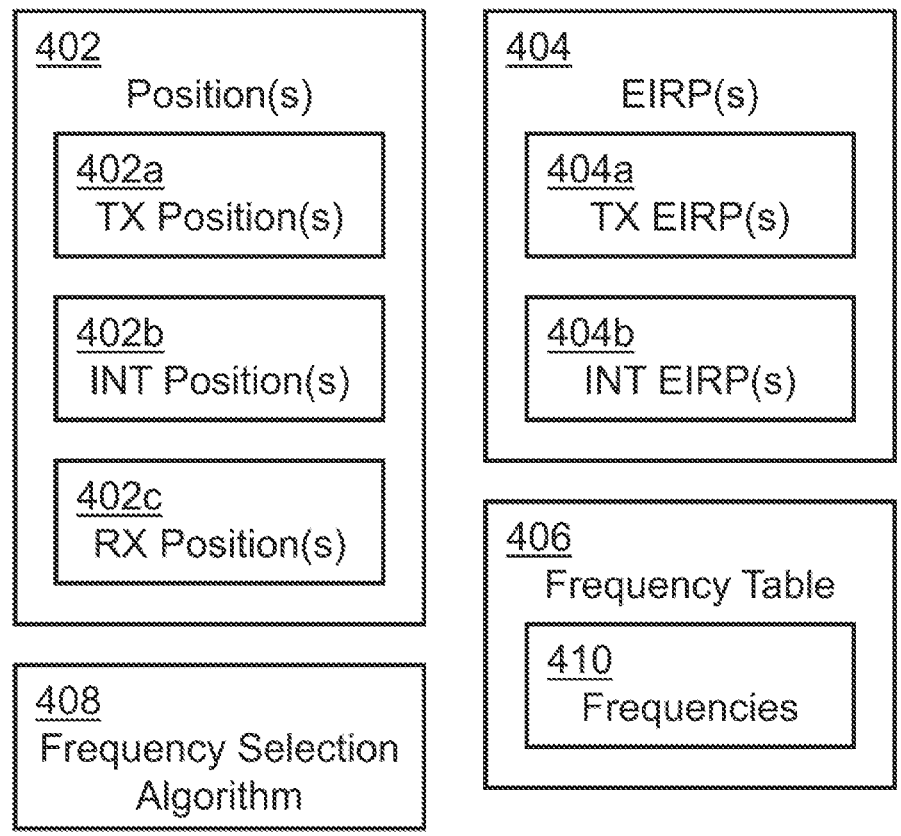
FIG. 4 depicts a simplified block diagram of a memory, in accordance with one or more embodiments of the present disclosure.

Referring now to FIG. 4, the memory 212 is described, in accordance with one or more embodiments of the present disclosure. The memory 212 may include positions 402, EIRPs 404, a frequency table 406, a frequency selection algorithm 408, and the like.

The positions 402 may be positions of the nodes in the system 100. The positions 402 may be in the form of coordinates (e.g., latitude/longitude coordinates). The positions 402 may include transmitter node positions 402a (i.e., position of the transmitter node 102), interferer node positions 402b (i.e., position of the interferer node 106), and/or receiver node positions 402c (i.e., position of the receiver node 104). The transmitter node positions 402a may be determined from a GNSS data. The interferer node positions 402b may be determined a priori. The receiver node positions 402c may be determined from the automatic link establishment 310, although this is not intended to be limiting.

Distances between nodes may be computed based on the locations. The distances may be on the order of several hundred kilometers up to thousands of kilometers, although this is not intended to be limiting.

The memory 212 may include a list of EIRPs 404 of the nodes in the system 100. The EIRPs 404 may include transmitter node EIRPs 404a and/or interferer node EIRPs 404b. The transmitter node EIRPs 404a may be much lower than the interferer node EIRPs 404b, where the interferer nodes 106 are fixed-site interferers.

The memory 212 may include a frequency table 406. The frequency table 406 may include a list of frequencies 410. The frequencies 410 may be frequencies in the HF band which the receiver nodes 102 and the transmitter nodes 104 use to establish the communication link 108.

The memory 212 may include a frequency selection algorithm 408. The frequency selection algorithm 408 may be further understood with reference to the method 600.

Figure 5:
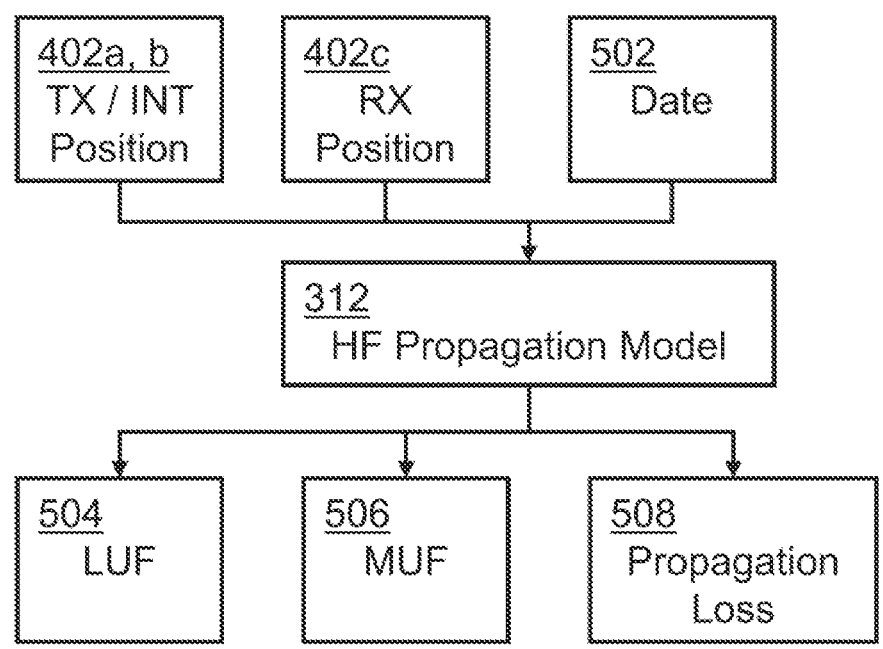
FIG. 5 depicts input and outputs of a high frequency (HF) propagation model, in accordance with one or more embodiments of the present disclosure.

Referring now to FIG. 5, the HF propagation model 312 is described, in accordance with one or more embodiments of the present disclosure. The HF propagation model 312 may include one or more inputs, such as, but not limited to, transmitter node position 402a, interferer node position 402b, receiver node position 402c, and/or the date 502.

The HF propagation model 312 may determine one or more parameters based on the date 502, such as, but not limited to, a sun spot number (SSN), and the like. The HF propagation model 312 may determine one or more parameters based on the transmitter node position 402a and/or the interferer node position 402b together with the receiver node position 402c, such as, but not limited to, a minimum angle in degrees, a distance between the nodes (e.g., distance in nautical miles or kilometers), and the like.

The HF propagation model 312 may include one or more outputs. The outputs may be determined based on the inputs (e.g., transmitter node position 402a, interferer node position 402b, receiver node position 402c, date 502), the SSN, and the like. The outputs may include a lowest useable frequency 504 (LUF), a maximum useable frequency 506 (MUF), and a propagation loss 508.

The LUF 504, the MUF 506, and the propagation loss 508 may be determined between each of the transmitter nodes and the receiver nodes. The LUF 504, the MUF 506, and the propagation loss 508 may also be determined between each of the interferer nodes and the receiver nodes. In this regard, the LUF 504, the MUF 506, and the propagation loss 508 may be dependent upon the receiver node position 402c and one of the transmitter node position 402a or interferer node position 402b depending upon whether the transmitter node 102 or the interferer node 106 is being analyzed. In embodiments, the LUF 504, the MUF 506, and the propagation loss 508 may be dependent upon distance between nodes, time of day, the sunspot number, and the like.

In embodiments, the HF propagation model 312 may output the LUF 504. The LUF 504 may refer to a lowest frequency at which the transmission is a lowest frequency in HF having a circuit reliability of 90 percent. Signals transmitted at frequencies below the LUF may experience high propagation loss.

In embodiments, the HF propagation model 312 may output the MUF 506. Frequencies above the MUF 506 may propagate. However, the probability of propagation for frequencies above the MUF 506 is 50% or less (i.e., the frequency may propagate less than 50% of the days in that month). The frequencies above the MUF 506 may pass through the ionosphere into space the remaining days of the month. Thus, HF signals at frequencies above the MUF 506 may propagate but the probability of propagation cannot be ensured. Signals transmitted at frequencies above the MUF may not be guaranteed to propagate or reflect from the ionosphere and return to ground at the location of the receiver. Instead, the transmission above the MUF may pass through the ionosphere to space.

In embodiments, the HF propagation model 312 may output the propagation loss 508. The propagation loss 508 may be determined for each of the frequencies 410 in the frequency table 406. The propagation loss 508 may also be referred to as a total path loss or path attenuation. For example, the path the communication link 108 follows from the transmitter nodes 102 to the receiver nodes 104 may experience a first propagation loss. By way of another example, the path the interfering signal 110 follows from the interferer nodes 102 to the receiver nodes 104 may experience a second propagation loss.

In some embodiments, the HF propagation model 312 may determine the LUF 504, the MUF 506, and the propagation loss 508 if the position (+/−50 miles) of the nodes are known.

Figure 6A:
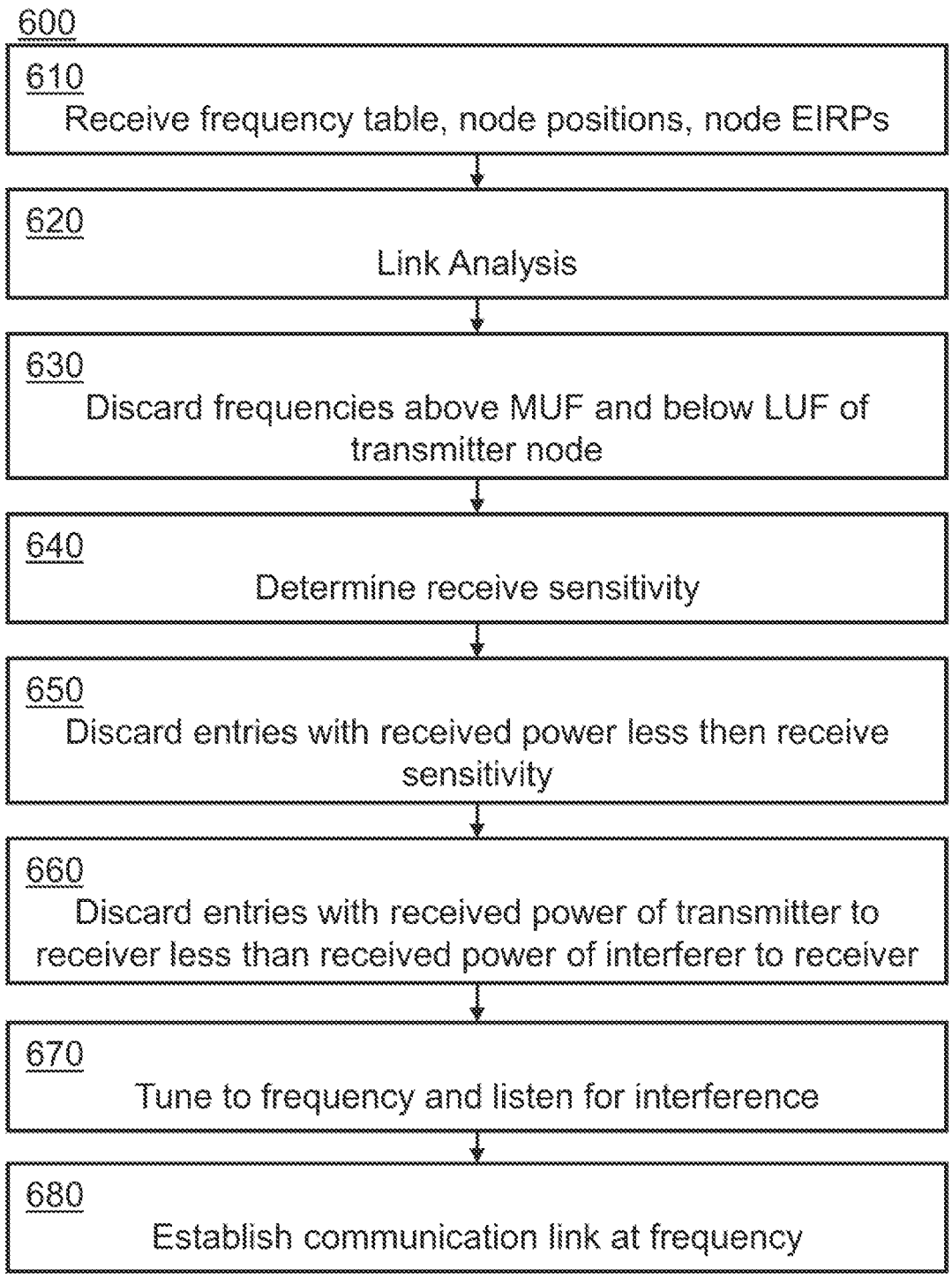

Referring now to FIG. 6, a flow diagram of method 600 is described, in accordance with one or more embodiments of the present disclosure. The embodiments and the enabling technology described previously herein in the context of the system 100, the node 200, and the waveform protocol stack 300 should be interpreted to extend to the method. For example, the method 600 may be implemented by the system 100, the node 200, and the waveform protocol stack 300. It is further recognized, however, that the method 600 is not limited to the system 100, the node 200, and the waveform protocol stack 300.

The method 600 may also be referred to as the frequency selection algorithm 408. The method 600 may be used to counter interferers through frequency selection and may ensure beyond line-of-sight (BLOS) communication given a priori knowledge of the location and EIRP of the interferers.

The method 600 may be further understood with reference to the exemplary tables provided in FIGS. 7A-7H. As an example, the system 100 may include one of the transmitter nodes 102, one of the receiver nodes 104, and a number M of the interferer nodes 106. The frequency table 406 may include N frequencies 410 in the HF band. For each hour of communication, there are then N+N*M computations. If there is one transmitter node, one receiver node, N frequencies, and M Interferer nodes then there are N possible signals related to communications between the transmitter node and receiver node and N×M entries related to signals from the interferer nodes and the receiver node. Thus, the method 600 may process N+(N*M) potential options for a given hour when the transmitter node is selecting a frequency to communicate with the receiver node.

In a step 610, frequency table 406, node positions 402, and node EIRPs 404 are received. The frequency table 406, node positions 402, and node EIRPs 404 may be received from memory 212.

In a step 620, a link analysis is performed. The link analysis may include performing a link analysis on each of communication links 108 between the transmitter nodes 102 and the receiver nodes 104 and also a link analysis on each of the interfering signals 110 from the interferer nodes 106 to the receiver nodes 104. The link analysis may be further understood with reference to FIG. 6B.

The link analysis may include a step 622 of determining LUF 504 and MUF 506. The LUF 504 and MUF 506 may be determined by computing a propagation analysis using the HF propagation model 312. The LUF 504 may include a LUF from the transmitter node 102 to the receiver node 104 and/or a LUF from the interferer nodes 106 to the receiver node 104. The LUF from the transmitter node 102 to the receiver node 104 may also be referred to as a TX to RX LUF or a F-LUF. The LUF from the interferer nodes 106 to the receiver node 104 may also be referred to as a Interferer(1 through M) to RX LUF or a I(1 through M)-LUF, where M is the number of the interferer nodes 106. The MUF 506 may include a MUF from the transmitter node 102 to the receiver node 104 and/or a MUF from the interferer nodes 106 to the receiver node 104. The MUF from the transmitter node 102 to the receiver node 104 may also be referred to as a TX to RX MUF or a F-MUF. The MUF from the interferer nodes 106 to the receiver node 104 may also be referred to as a Interferer(1 through M) to RX MUF or a I(1 through M)-MUF, where M is the number of the interferer nodes 106. In this regard, each of the transmitter nodes 102 and/or interferer nodes 106 may include LUF 504 and MUF 506 to the receiver node 104.

The link analysis may include a step 624 of determining propagation losses 508 for each of the frequencies 410 in the frequency table 408. The propagation losses 508 for each of the frequencies 410 may be determined by computing a propagation analysis using the HF propagation model 312. The propagation losses 508 may include transmitter propagation losses from the transmitter nodes 102 to the receiver nodes 104. The propagation losses 508 may include interferer propagation losses from the interferer nodes 106 to the receiver nodes 104.

The link analysis may include a step 626 of determining a plurality of received powers 702 (e.g., Rcv'd power) at the receiver node 106 for each of the frequencies 410. The received powers 702 may also be referred to as a receiver signal level or a signal level that lands at the receiver node at the selected frequency. The received powers 702 may be computed for signals from the transmitter nodes 102 to the receiver nodes 104 (e.g., for the communication link 108). The received powers 702 may be computed for signals from the interferer nodes 106 to the receiver nodes 104 (e.g., for the interfering signal 110). The received powers 702 may be determined by computing a link budget. For example, the link budget may include a transmit power of a node (e.g., EIRP 404) minus propagation losses 508 between the node (e.g., transmitter nodes 102, interferer nodes 106) and the receiver node 104. The received powers 702 and/or link budgets may be computed for a range of frequencies in the frequency table 406 at a given time of day. The received powers 702 may then indicate signals that the transmitter node 102 and/or the interferer node 106 may land at the receiver node 104.

The received powers 702 may be determined for every transmitter node 102, receiver node 104, and interferer node 106 of the system 100. The received power 702 may also be determined for every frequency 410 in the frequency table 406. The received power 702 may also be determined for hours during the day. In this regard, a large number of received powers 702 may be determined.

In a step 630, the frequencies above the MUF of the transmitter node (e.g., TX to RX MUF or F-MUF) are discarded. The frequencies 410 below the LUF of the transmitter node (e.g., TX to RX LUF or F-LUF) may also be discarded. Discarding the frequencies above the F-MUF and below the F-LUF may be beneficial to reduce the total number of available frequencies required for processing. The frequencies above the F-MUF and below the F-LUF may be discarded to determine a subset 704 of the frequencies 410 and/or received powers 702. The transmitter node will then not use a frequency above the F-MUF or below the F-LUF after discarding frequencies above the F-MUF and below the F-LUF.

In a step 640, a plurality of receive sensitivities 706 of the receiver node are determined. Receive sensitivity may refer to the lowest signal that the receiver node 104 can hear. The receiver node 104 is unable to hear signals below the receive sensitivity. The receive sensitivity may be based on an architecture of the receiver node, robustness of the waveform employed, and frequency of operation, and is not intended to be limiting. The receive sensitivities 706 of the receiver node may be determined for each frequency between the LUF and the MUF of the transmitter node. For example, the receive sensitivities 706 of the receiver node may be determined for the subset 704. In this regard, the receive sensitivities 706 are not determined for the frequencies below the F-LUF or above the F-MUF.

In a step 650, the received powers 702 at the receiver node which are less than the receive sensitivities 706 are discarded to determine a subset 708. The received powers 702 being less than the receive sensitivities 706 indicates the receiver node 104 is unable to receive the signal (e.g., the communication link 108 and/or the interfering signal 110 is below the receive sensitivity). There is no point using frequencies with receiver signal levels below the receiver sensitivity because even if the transmitter node may transmit a signal to the receiver node which is higher than the interferer node on that frequency, the receiver node is unable to hear the signal due to limitations with the receiver sensitivity. The subset 708 of available frequencies in the frequency table 406 has now been reduced based on the LUF between the transmitter node and the receiver node, the MUF between the transmitter node and the receiver node, and the receive sensitivity.

In embodiments, the entries may be separated into desired signal entries and interferer entries subsequent to the step 650. The desired signal entries and the corresponding interferer entries may then be ordered based on frequency (low to high or high to low).

In a step 660, the received power 702 of the signal from the transmitter node 102 to the receiver node 104 (e.g., TX to RX communication link 108) is compared with each of the received powers 702 of the signals from the interferer nodes to the receiver node (e.g., Interferer to RX interfering signal 110) for every frequency in the subset 708. If any of the interferer entries are above the signal entry at a given frequency then the given frequency cannot be used. The interferer node may interfere with the transmit signal if the signal level from the transmitter node to the receiver node to is less than the signal level from the interferer node to the receive node.

If the received power 702 of the signal from the transmitter node 102 to the receiver node 104 is greater than all of the received powers of the signals from the interferer nodes to the receiver node at a given frequency, then the given frequency may be added to a short-listed frequency table or a subset 710. The subset 710 may be a subset of the subset 704 and/or the subset 708. If the received power 702 of the signal from the transmitter node 102 to the receiver node 104 is less than any of the received powers of the signals from the interferer nodes to the receiver node at a given frequency, then the given frequency is discarded from the subset 710.

The received power of the signal from the transmitter node 102 to the receiver node 104 may be compared with all of the received powers of the signals from the interferer nodes to the receiver node by computing a link margin for every frequency. The link margin may refer to a difference between the desired signal and the interfering signal and for every interfering node. The link margin may be measured in dB. Higher link margins may indicate the given frequency has a higher probability of surviving interfering. The subset 710 may also include link margins over the strongest interferer. The strongest interferer may refer to interferer node with the highest received power at the receiver node.

Thus, the subset 710 includes frequencies which are between the MUF and LUF of the transmitter, are able to be received by the receiver, and have a link margin over the strongest interferer. In this regard, the subset 710 may be determined by discarding any of the subset 704 in which the received powers from the transmitter node to the receiver node are below the receive sensitivities 706 and in which the received powers from the transmitter node to the receiver node are below the received powers from the interferer nodes to the receiver node.

In embodiments, the subset 710 may be sorted based on the link margin. For example, the subset 710 may be sorted such that frequencies with the highest link margin are at the top of the subset 710.

In a step 670, the software-defined radio 204 is tuned to a frequency and listen for interference on that frequency. The software-defined radio 204 may be tuned to any of the frequencies in the subset 710. In embodiments, the software-defined radio 204 is tuned to the frequency with the highest link margin over the interfering nodes. If the interference is greater than a threshold, the software-defined radio may tune to the frequency with the next highest link margin in the subset 710 and listen for interference at that frequency.

In a step 680, the software-defined radio 204 uses the frequency with interference below the threshold to establish the communication link 108 with the receiver node 106.

Referring now to FIG. 8, a flow diagram of a method 800 is described, in accordance with one or more embodiments of the present disclosure. The method 800 may describe an optional step which is performed on the subset 710 between the step 660 and the step 670 of the method 600.

In embodiments, the subset 710 or short-listed frequency table may be split into a primary list and a secondary list based on the MUF between the interferer nodes 106 and the receiver node 104 (e.g., I-MUF). The frequencies in the subset 710 may be compared with the MUFs 504 (e.g., Interferer to RX or I-MUF). Frequencies in the subset 710 below the I-MUF may be added to the primary list. Frequencies in the subset 710 above the I-MUF may be added to the secondary list.

The interferer node 106 is unable to guarantee that the interfering signal 110 will propagate from the interferer node 106 to the receiver node 104 at frequencies above the I-MUF. In this regard, the interferer node may not pick frequencies to transmit the interfering signal 110 that are above the I-MUF to prevent wasting interfering resources.

In a step 820, the primary list and the secondary list may be sorted based on link margin. For example, the primary list and the secondary list may be sorted such that the highest link margins are first in the table.

In a step 832, the short-list or subset 710 may be recreated by appending the secondary list to the primary list. Notably, the short-list or subset 710 is now in a different order due to appending the secondary list to the primary list. Appending may refer to adding the frequencies from the secondary list after the frequency in the primary list. The method 800 may then proceed to step 670 using the subset 710 with the secondary list appended to the primary list. In this case, the transmitter node 102 is unsure of the behavior of the interferer node 106. For example, the transmitter node 102 is unsure if the interferer node 106 will transmit above the I-MUF.

In another instantiation or a step 834, the short-list or subset 710 may be recreated by appending the primary list to the secondary list. The method 800 may then proceed to step 670 using the subset 710 with the primary list appended to the secondary list. In this case, the transmitter node 102 is sure of the behavior of the interferer node 106. For example, the transmitter node 102 is sure that the interferer node 106 will not transmit the interfering signal 110 at frequencies above the I-MUF of the interferer node 106. The transmitter node 102 may then select frequencies above the I-MUF with the highest link margin (e.g., the secondary list). The primary frequencies are appended to the secondary frequencies to provide a backup in case none of the secondary frequencies are available.

Figure 9:
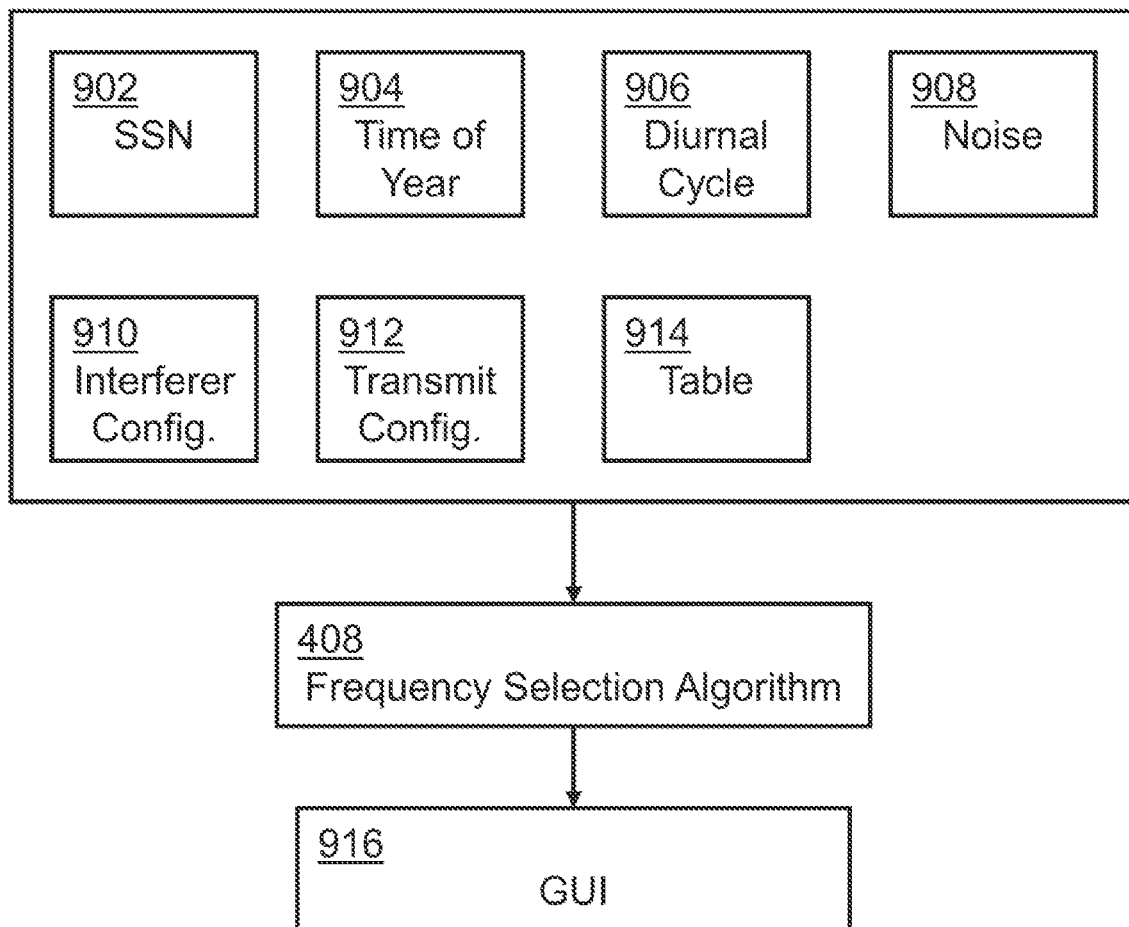
FIG. 9 depicts a simplified block diagram of an HF mission planner, in accordance with one or more embodiments of the present disclosure.

Referring now to FIG. 9, an HF Mission Planner 900 is described, in accordance with one or more embodiments of the present disclosure. The HF Mission Planner 900 may include the frequency selection algorithm 408. The embodiments and enabling technologies described previously herein may also be implemented by the HF Mission Planner 900.

The HF Mission Planner 900 may simulate a mission with different sets of parameters. The parameters may include, but are not limited to, Sun Spot Cycle Period 902 (e.g., a SSN ranging between 0 and 200 or more), a time of the year 904 (e.g., Month, Summer, Winter, Fall, Spring), diurnal cycle 906 (e.g., Dusk, Dawn, Day, Night, and/or time of day), background noise 908 (e.g., location, frequency), interferer configurations 910 (e.g., interferer position, interferer EIRP), transmitter configurations 912 (transmitter node placement, transmitter node EIRP), frequency table 914, and the like.

In embodiments, the HF Mission Planner 900 may determine the short-listed frequency table or the subset 710 for several hours of communication. In this regard, the subset 710 may include frequencies which are expected to be successfully received over the interfering signal 110. The frequencies may change between hours throughout the diurnal cycle. The subset 710 with several hours of the frequencies may be referred to as an hourly frequency table, although this is not intended to be limiting.

The HF Mission Planner 900 may output a graphical user interface 916 based on the inputs. The graphical user interface 916 may indicate whether the transmitter nodes are able to establish communication in the presence of the interferer nodes. The graphical user interface 916 may indicate whether communication may work during a mission. The mission may then be implemented using the frequency table 914 with confidence that the BLOS communications will survive interfering from the interferer nodes. The graphical user interface 916 may also provide different transmitter and/or interferer configurations.

The HF mission planner 900 may be used for offensive mission planning. In offensive mission planning, attacking transmitter and attacking receiver node placements may be tested against defensive interferer placements. The HF mission planner 900 may select frequencies and node assets with required EIRP to see if communication may occur in the presence of interfering. The HF mission planner 900 may determine the optimal placement of the transmitter node and receiver node to ensure communication in the presence of interferer nodes. For example, the HF mission planner 900 may determine the placement by iteratively changing the positions of the transmitter node and receiver node until one or more of the frequencies is received above the interfering signal 110.

The HF mission planner 900 may be used for defensive mission planning. In defensive mission planning, interferer node placements may be tested against interferer transmitter node and interferer receiver node deployments. The HF mission planner 900 may determine if the interferers are successful in interfering with other communication. The HF mission planner 900 may determine the optimal placement of the interferer nodes for denying the communication link 108 (e.g., deny HF BLOS communication) between the transmitter node and the receiver node positioned in a given airspace.

Referring generally again to FIGS. 1-9.

The waveform protocol stack 300 may include date, time, Sun Spot Number (SSN), transmitter configuration, receiver configuration, and/or interferer configuration. The transmitter configuration may include (position (e.g., latitude, longitude), EIRP, beamwidth, axial direction, and the like). The receiver configuration may include a position (e.g., latitude, longitude), receiver sensitivity, and the like. The interferer configuration may include information about known interferers (position (e.g., latitude, longitude), EIRP, beamwidth, axial direction, and the like). The waveform may also receive interferer configuration updates. The interferer configuration updates may be received over the air (in-band and/or out-of-band).

The method 600 may or may not include discarding interferer signals which are above the MUF of the interferer or below the LUF of the interferer. In this regard, frequencies which are above the MUF of the interferer or below the LUF of the interferer may still propagate from the interferer node to the receiver node but with higher path loss and/or with a likelihood of being lost to space. In embodiments, the higher path loss may be accounted for in a link budget.

In some instances, the subset 710 may be empty indicating that there is no frequency usable to survive the interfering configuration at the given date and time.

Because networks configured in accordance with embodiments of the inventive concepts disclosed herein use a TDMA based waveform, an interruption mechanism can be implemented to interrupt a transmission in progress at time slot boundaries. Since a TDMA transmission is bounded within the time slot boundary, a node can interrupt another node at slot boundaries even if the next slot is not assigned to the interrupting node.

The methods, operations, and/or functionality disclosed may be implemented as sets of instructions or software readable by a device. The steps may include computations which may be performed simultaneously, in parallel, or sequentially. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented. It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

A processor may include any processing unit known in the art. For example, the processor may include a multi-core processor, a single-core processor, a reconfigurable logic device (e.g., FPGAs), a digital signal processor (DSP), a special purpose logic device (e.g., ASICs)), or other integrated formats. Those skilled in the art will recognize that aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure. Such hardware, software, and/or firmware implementation may be a design choice based on various cost, efficiency, or other metrics. In this sense, the processor(s) may include any microprocessor-type device configured to execute software algorithms and/or instructions. In general, the term "processor" may be broadly defined to encompass any device having one or more processing elements, which execute program instructions from memory, from firmware, or by hardware implemented functions. It should be recognized that the steps described throughout the present disclosure may be carried out by the processors.

A memory may include any storage medium known in the art. For example, the storage medium may include a non-transitory memory medium. For instance, the non-transitory memory medium may include, but is not limited to, a read-only memory (ROM), a random-access memory (RAM), a magnetic or optical memory device (e.g., disk), a solid-state drive and the like. It is further noted that memory may be housed in a common controller housing with the one or more processor(s). For example, the memory and the processor may be housed in a processing unit, a desktop computer, or the like. In an alternative embodiment, the memory may be located remotely with respect to the physical location of the processor. In another embodiment, the memory maintains program instructions for causing the processor(s) to carry out the various steps described through the present disclosure. For example, the program instructions may include a frequency selection algorithm, an HF mission planner, and the like.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A software-defined radio comprising:
   a memory maintaining program instructions; and
   one or more processors configured to execute the program instructions causing the one or more processors to:
      determine a first lowest usable frequency (LUF) and a first maximum usable frequency (MUF), wherein the first LUF and the first MUF are from a transmitter node to a receiver node;
      determine a first plurality of received powers at the receiver node for a plurality of frequencies in a high-frequency (HF) band, wherein the first plurality of received powers are signals from the transmitter node;
      determine a second plurality of received powers at the receiver node for the plurality of frequencies, wherein the second plurality of received powers are signals from an interferer node;
      determine a first subset of the plurality of frequencies by discarding any of the plurality of frequencies which are above the first MUF and by discarding any of the plurality of frequencies which are below the first LUF;
      determine a plurality of receive sensitivities of the receiver node for each of the first subset; and
      determine a second subset of the first subset by discarding any of the first subset in which the first plurality of received powers are below the plurality of receive sensitivities and in which the first plurality of received powers are below the second plurality of received powers.

2. The software-defined radio of claim 1, wherein the plurality of frequencies are from a frequency table maintained in the memory.

3. The software-defined radio of claim 1, wherein the first plurality of received powers are determined by the one or more processors determining a first plurality of propagation losses between the transmitter node and the receiver node for each of the plurality of frequencies and computing a first plurality of link budgets for each of the plurality of frequencies using the first plurality of propagation losses; and
   wherein the second plurality of received powers are determined by the one or more processors determining a second plurality of propagation losses between the interferer node and the receiver node for each of the plurality of frequencies and computing a second plurality of link budgets for each of the plurality of frequencies using the second plurality of propagation losses.

4. The software-defined radio of claim 1, wherein the one or more processors are configured to determine a plurality of link margins for the second subset based on the first plurality of received powers, the second plurality of received powers, and the plurality of receive sensitivities.

5. The software-defined radio of claim 1, wherein the software-defined radio is configured to cause the transmitter node to communicate with the receiver node using a time division multiple access (TDMA) waveform at a first frequency of the second subset; wherein the first frequency includes a highest link margin of the second subset.

6. The software-defined radio of claim 5, wherein the TDMA waveform is more resilient than waveform number 0 Walsh Mode defined in MIL-STD-188-110D.

7. The software-defined radio of claim 5, wherein the software defined radio is further configured to tune to the first frequency and listen for interference; detect the interference is below a threshold; and cause the transmitter node to communicate with the receiver node using the TDMA waveform at the first frequency in response to detecting the interference is below the threshold.

8. The software-defined radio of claim 5, wherein the software defined radio is further configured to tune to the first frequency and listen for interference; detect the interference is above a threshold; and cause the transmitter node to communicate with the receiver node using the TDMA waveform at a second frequency of the second subset in response to detecting the interference is below the threshold; wherein the second frequency has a second highest link margin of the second subset.

9. The software-defined radio of claim 1, wherein the one or more processors are configured to determine a second MUF and a second LUF; wherein the second MUF and the second LUF are between the interferer node and the receiver node.

10. The software-defined radio of claim 9, wherein the one or more processors are configured to determine a primary list and a secondary list based on the second subset; wherein the primary list comprises each frequency in the second subset below the second MUF; wherein the secondary list comprises each frequency in the second subset above the second MUF; wherein the one or more processors are configured to sort the primary list and the secondary list based on link margin.

11. The software-defined radio of claim 10, the one or more processors are configured to generate a frequency table by appending the secondary list to the primary list.

12. The software-defined radio of claim 10, the one or more processors are configured to generate a frequency table by appending the primary list to the secondary list.

13. The software-defined radio of claim 1, wherein the first MUF indicates a probability of propagation between the transmitter node and the receiver node may be maintained on 50 percent of days of a month.

14. A method comprising:
  determining a first lowest usable frequency (LUF) and a first maximum usable frequency (MUF), wherein the first LUF and the first MUF are from a transmitter node to a receiver node;
  determining a first plurality of received powers at the receiver node for a plurality of frequencies in a high-frequency (HF) band, wherein the first plurality of received powers are signals from the transmitter node;
  determining a second plurality of received powers at the receiver node for the plurality of frequencies, wherein the second plurality of received powers are signals from an interferer node;
  determining a first subset of the plurality of frequencies by discarding any of the plurality of frequencies which are above the first MUF and by discarding any of the plurality of frequencies which are below the first LUF;
  determining a plurality of receive sensitivities of the receiver node for each of the first subset; and
  determining a second subset of the first subset by discarding any of the first subset in which the first plurality of received powers are below the plurality of receive sensitivities and in which the first plurality of received powers are below the second plurality of received powers.

15. The method of claim 14, comprising causing the transmitter node to communicate with the receiver node using a time division multiple access (TDMA) waveform at a first frequency of the second subset; wherein the first frequency includes a highest link margin of the second subset.

16. A HF mission planner comprising:
  a memory maintaining program instructions; and
  one or more processors configured to execute the program instructions causing the one or more processors to:
    determine a first lowest usable frequency (LUF) and a first maximum usable frequency (MUF), wherein the first LUF and the first MUF are from a transmitter node to a receiver node;
    determine a first plurality of received powers at the receiver node for a plurality of frequencies in a high-frequency (HF) band, wherein the first plurality of received powers are signals from the transmitter node;
    determine a second plurality of received powers at the receiver node for the plurality of frequencies, wherein the second plurality of received powers are signals from an interferer node;
    determine a first subset of the plurality of frequencies by discarding any of the plurality of frequencies which are above the first MUF and by discarding any of the plurality of frequencies which are below the first LUF;
    determine a plurality of receive sensitivities of the receiver node for each of the first subset; and
    determine a second subset of the first subset by discarding any of the first subset in which the first plurality of received powers are below the plurality of receive sensitivities and in which the first plurality of received powers are below the second plurality of received powers.

17. The HF mission planner of claim 16, wherein the program instructions are configured to cause the one or more processors to generate the second subset for a plurality of hours in a diurnal cycle.

18. The HF mission planner of claim 16, wherein the program instructions are configured to determine placement of the transmitter node and the receiver node to ensure communication in the presence of the interferer node.

19. The HF mission planner of claim 16, wherein the program instructions are configured to determine placement of the interferer node to deny the signals from the transmitter node to the receiver node.

* * * * *